United States Patent [19]
Lang

[11] Patent Number: 5,835,602
[45] Date of Patent: Nov. 10, 1998

[54] SELF-SYNCHRONOUS PACKET SCRAMBLER

[75] Inventor: Steven Forbes Lang, Vancouver, Canada, V6N 3Z8

[73] Assignee: PMC-Sierra Ltd., Burnaby, Canada

[21] Appl. No.: 698,900

[22] Filed: Aug. 19, 1996

[51] Int. Cl.⁶ ........................................... H04L 9/00
[52] U.S. Cl. ................... 380/49; 380/48; 380/50
[58] Field of Search ...................... 380/48, 49, 50

[56] References Cited

U.S. PATENT DOCUMENTS 5,086,470  2/1992  Ballance ..................... 380/48
5,345,508  9/1994  Lynn et al. ................. 380/50

*Primary Examiner*—Stephen C. Buczinski
*Attorney, Agent, or Firm*—Pascal & Associates

[57] ABSTRACT

A digital data transmission system of a type that uses NRZ line coding, comprising apparatus for generating data sequences comprising at least flag sequences and packet data, a frame generator for assembling scrambled data sequences, into frames for transmission to a receiver, and a self synchronous scrambler for continuously scrambling the data sequence including the flag sequences and packet data, and delivering the resulting scrambled data sequence to the frame generator.

13 Claims, 2 Drawing Sheets

SELF-SYNCHRONOUS PACKET SCRAMBLER

FIELD OF THE INVENTION

This invention relates to the field of data transmission, and in particular to a packet based system which uses non-return to zero (NRZ) line coding.

BACKGROUND TO THE INVENTION

Non-return to zero (NRZ) encoded transmission systems rely on the statistical nature of transmitted data to ensure adequate voltage or current transition density over a transmission link. Adequate transition density is required to ensure that an accurate representation of the transmit clock can be recovered at the receiver. If there would be inadequate transition density, the clock recovery circuitry at the receiver could tend to drift, and data detection circuitry would become mistimed, reporting erroneous bit values.

In order to ensure that adequate transition density exists, many NRZ encoded transmission systems rely on scrambling to randomize the data prior to transmission. The SONET format, as described in GR-253-CORE—"Synchronous optical Network Transport Systems: Common Generic Criteria" issue 1, Dec. 1994, Bellcore, is an example of such as system. A frame synchronous SONET scrambler described in this publication works very well for many of the payload mappings that are defined, but there is a subset of payload mappings for which frame synchronous scrambling is not adequate. Two of these are cell-based mappings, ATM (asynchronous transfer mode) and DQDB and are described as requiring an additional level of scrambling using a self synchronous scrambler.

In the publication RFC-1619 "PPP over SONET/SDH", Issue 1, May 1994, Internet Engineering Task Force, a packet based point to point protocol (PPP) is described as being mapped directly into the SONET payload envelope. The publication notes that packet-level scrambling is not required when the PPP is mapped into the SONET payload. However in this case a malicious user may generate packets consisting of the SONET frame synchronous scrambler sequence. This sequence, when XORed with the actual frame synchronous scrambler generates arbitrarily long run lengths (i.e. periods of no transitions) in the transmitted sequence. These long runs of ones or zeros disrupt the receive clock recovery circuit and cause the transmission link to malfunction.

In general, packet based mappings into NRZ encoded transmission systems present a problem since a single user controls the payload contents for the duration of the packet.

SUMMARY OF THE INVENTION

The present invention avoids the possibility of a user being able to generate arbitrarily long run lengths of a transmitted sequence, and thus disrupt the system. It does this by scrambling packet based mappings before insertion into a payload envelope such as a frame, e.g. as used in a SONET system. Scrambling is performed, using a self-synchronous scrambler, on the entire data sequence including the packet data and the flag sequences used to delineate the packets.

Since the self synchronous scrambler depends on the contents of previous packets, its state is not discernible by any user. The probability of long run lengths in the NRZ encoded bit stream is reduced from a highly likely event to a statistically insignificant one.

In accordance with an embodiment of the invention, a method of communicating data is comprised of randomizing a data sequence, forming frames of the randomized data sequence and transmitting the frames to a receiver.

In accordance with another embodiment, a digital data transmission system of a type that uses logic level transitions for clock recovery, is comprised of apparatus for generating data sequences comprising at least flag sequences and packet data, a frame generator for assembling scrambled data sequences input thereto, into frames for transmission to a receiver, and a self synchronous scrambler for continuously scrambling the data sequence including the flag sequences and packet data and delivering the resulting scrambled data sequence to the frame generator.

In accordance with another embodiment, a digital data transmission system of a type that uses logic level transitions for clock recovery, is comprised of apparatus for generating data sequences comprising at least flag sequences and packet data, a frame generator for assembling randomized data sequences input thereto, into frames for transmission to a receiver, and a randomizer for continuously randomizing the density of data transitions in the data sequence including the flag sequences and packet data and delivering the resulting randomized data sequence to the frame generator.

BRIEF INTRODUCTION TO THE DRAWINGS

A better understanding of the invention will be obtained by considering the detailed description below, with reference to the following drawings, in which.

DETAILED DESCRIPTION OF PREFERRED EMBODIMENT

Figure 1:
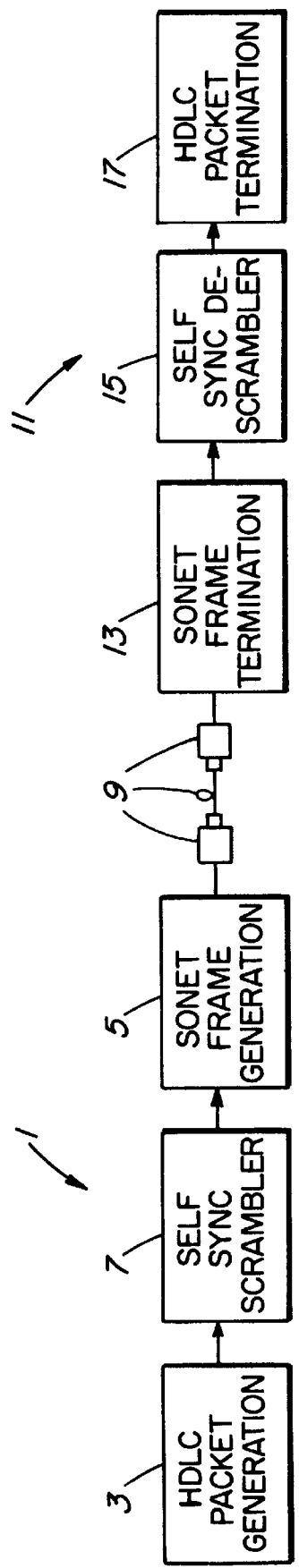
FIG. 1 is a block diagram of a system incorporating the present invention.

FIG. 1 illustrates a system implementing the present invention. A transmitter, 1 is comprised of a High Level Data Link Controller (HDLC) packet generator 3 for receiving input data and generating packets, each packet typically comprised of flag sequences, packet data and a frame check sequence (FCS). The packets are typically delivered to a frame generator such as a SONET frame generator 5. The frame generator assembles the packets provided to it into frames and provides the frames to an optical fiber link 9 to a receiver 11.

In accordance with the present invention, the entire sequence is scrambled by a self synchronous scrambler 7 prior to insertion into the SONET payload envelope by the frame generator 5. The self synchronous scrambler 7 runs continuously throughout the packet data and the flag sequences that delineate the individual packets. This differs from the self synchronous scrambler used for cell-based payloads such as ATM described in the GR-253-CORE publication noted earlier, which is stopped during the ATM cell headers.

In the receiver 11, a SONET frame terminator 13 recovers the clock from the scrambled data sequence, frames to the sequence, translates the received frames into packets, and delivers them to a self synchronous descrambler 15. Here the packets are descrambled and delivered to an HDLC packet terminator 17, where the packets are delineated and checked using the FCS.

Due to the randomization of the bit transitions by the self synchronous scrambler 7, there is a statistically insignificant likelihood of there being long transmissions of unbroken strings of ones or zeros, and therefore a reduced likelihood of clock recovery failure.

Figure 2:
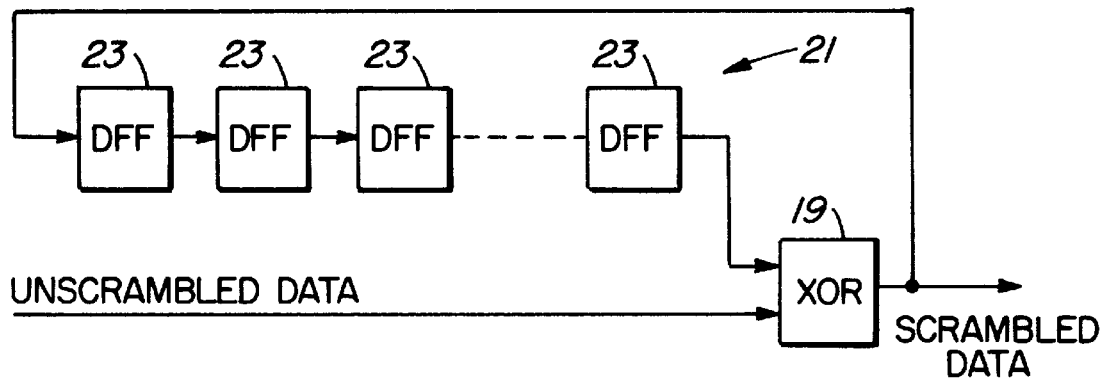
FIG. 2 is a block diagram of a self synchronous scrambler that can be used to implement the present invention.

FIG. 2 illustrates an embodiment of a self synchronous scrambler that can be used as element 7. However other means of randomization of bit transitions could be used, rather than the scrambler described herein.

The scrambler is comprised of an XOR gate 19, to one input of which the unscrambled data, e.g. the HDLC packets, is applied. Scrambled data is output from the XOR gate, and is provided to the input of the frame generator 5. This scrambled data is also provided to the input of a synchronous delay device 21, which can be formed of a series of D type flip flops 23. The output of the delay device 21 is applied to another input of XOR gate 19.

The self synchronous scrambler XORs the unscrambled incoming data with a delayed version of the scrambled data. The resulting scrambled data is fed back into the synchronous delay element 21. The states of the flip flops 23 in the delay element is based on the previous data entering the scrambler, and cannot be easily determined without knowing the complete history of all packets entering the scrambler. For example, the delay element could be a 43 bit delay element.

Figure 3:
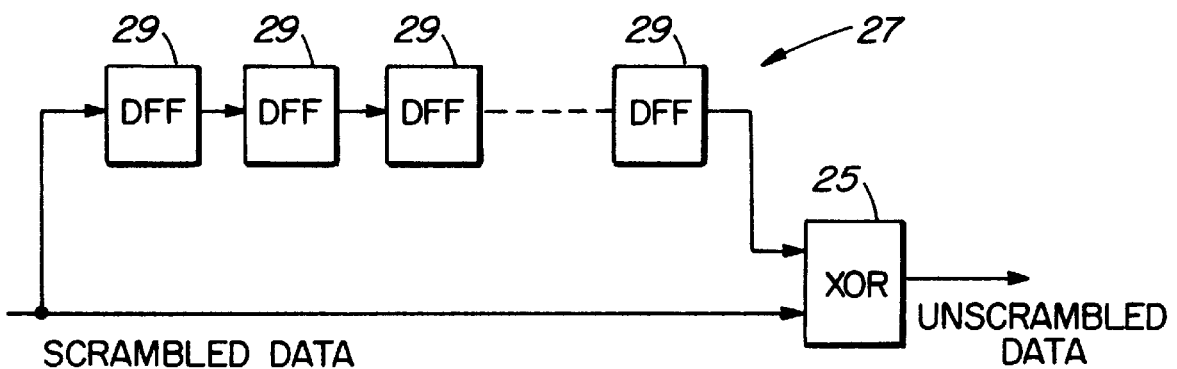
FIG. 3 is a block diagram of a self synchronous descrambler that can be used to implement the present invention.

A self synchronous descrambler that can be used as element 15 is illustrated in FIG. 3. However other means of derandomization can be used.

The self synchronous descrambler shown is comprised of an XOR gate, to one input of which the scrambled data, i.e. the packets output from frame terminator 13, are applied. This scrambled data is also applied to a synchronous delay device 27, preferably formed of a series of D-type flip flops 29. The output of the delay device 27 is applied to another input of XOR gate 25. The delay device 27 must have the same delay as the delay device 21.

The self synchronous descrambler XORs the incoming scrambled data with a delayed version of the scrambled data, and the output of the XOR device 25 is packets of unscrambled data.

A self synchronous scrambler described in the aforenoted GR-253-CORE article uses a polynomial of x43+1 for the cell-based ATM payload mapping, and requires a 43 bit delay device. The X43+1 self synchronous scrambler can also be used for packet based scrambling, as described in the present invention, but the present invention is not limited to that particular scrambler.

While the embodiment described above was directed to HDLC packets and SONET frames, the present invention can be used with any NRZ-based transmission system wherein a frame synchronous scrambler is used to randomize the ones density.

A person understanding this invention may now conceive of alternative structures and embodiments or variations of the above. All those which fall within the scope of the claims appended hereto are considered to be part of the present invention.

I claim:

1. A digital data transmission system of a type that uses NRZ line coding, comprising:
   (a) means for generating data sequences comprising at least flag sequences and packet data;
   (b) a self synchronous scrambler for continuously scrambling said data sequences including said flag sequences and packet data,
   (c) a frame generator for assembling said scrambled data sequences into frames for transmission to a receiver, and
   (d) means for delivering said scrambled data sequences to said frame generator.

2. A system as defined in claim 1, including a receiver for receiving frames of scrambled data, said receiver having a frame translator for translating received frames of data into packets, and a self synchronous descrambler for self synchronously descrambling said received packets.

3. A system as defined in claim 2 in which the frame terminator recovers a clock from the scrambled data sequence.

4. A system as defined in claim 1 including a packet generator adapted to generate said data sequences in HDLC protocol, and in which the frame generator is adapted to generate frames in SONET protocol.

5. A system as defined in claim 1 in which said scrambler is comprised of a first XOR gate for receiving said data sequences at one input, for outputting scrambled data, for applying said scrambled data via a first synchronous delay device to a second input of the XOR gate.

6. A system as defined in claim 5 in which said synchronous delay device is comprised of a serially connected sequence of D type flip flops.

7. A system as defined in claim 2 in which said scrambler is comprised of a first XOR gate for receiving said initial packets at one input, for outputting scrambled data, for applying said scrambled data via a first synchronous delay device to another input of the XOR gate, and in which said descrambler is comprised of a second XOR gate for receiving at an input said received packets, a second synchronous delay device for providing delayed received packets and for providing the delayed received packets to another input of the second XOR gate, and means for providing the descrambled packets at an output of the second XOR gate, delays provided by the first and second delay devices being equal to each other.

8. A system as defined in claim 7 in which each of said first and second synchronous delay devices are comprised of a serially connected sequence of D type flip flops.

9. A digital data transmission system of a type that uses NRZ line coding, comprising:
   (a) means for generating data sequences comprising at least flag sequences and packet data,
   (b) a randomizer for continuously randomizing the density of data transitions in the data sequence including the flag sequences and packet data,
   (c) a frame generator for assembling data sequences input thereto, into frames for transmission to a receiver, and
   (d) means for delivering the resulting randomized data sequences to the frame generator.

10. A method of communicating data comprising randomizing transitions of a data sequence, forming frames of the randomized data sequences and transmitting the frames to a receiver.

11. A method as defined in claim 10 in which the randomizing step is comprised of scrambling said data.

12. A method as defined in claim 10 including receiving said frames at said receiver, and derandomizing transitions of the data sequence.

13. A method as defined in claim 12 including recovering a clock from the randomized data sequence prior to the derandomizing step.

* * * * *